(12) United States Patent
Thuet

(10) Patent No.: US 12,398,805 B2
(45) Date of Patent: Aug. 26, 2025

(54) DEPTH GAUGE SEAL

(71) Applicant: Blancpain SA, Le Brassus (CH)

(72) Inventor: Arnaud Thuet, Les Rousses (FR)

(73) Assignee: BLANCPAIN SA, Le Brassus (CH)

( * ) Notice: Subject to any disclaimer, the term of this patent is extended or adjusted under 35 U.S.C. 154(b) by 328 days.

(21) Appl. No.: 17/730,757

(22) Filed: Apr. 27, 2022

(65) Prior Publication Data

US 2022/0349473 A1  Nov. 3, 2022

(30) Foreign Application Priority Data

Apr. 29, 2021 (EP) ..................................... 21171306

(51) Int. Cl.
| | | |
|---|---|---|
| *F16J 15/32* | (2016.01) | |
| *F16J 15/02* | (2006.01) | |
| *G01C 5/06* | (2006.01) | |
| *G01F 23/14* | (2006.01) | |
| *G01F 23/16* | (2006.01) | |
| *G01L 7/08* | (2006.01) | |
| *G01L 19/00* | (2006.01) | |
| *G01L 19/06* | (2006.01) | |
| *G01L 19/14* | (2006.01) | |
| *G04B 37/08* | (2006.01) | |
| *G04B 47/06* | (2006.01) | |

(Continued)

(52) U.S. Cl.
CPC ............ *F16J 15/32* (2013.01); *F16J 15/021* (2013.01); *G01C 5/06* (2013.01); *G01F 23/14* (2013.01); *G01F 23/164* (2013.01); *G01L 7/084* (2013.01); *G01L 19/0046* (2013.01); *G01L 19/0645* (2013.01); *G01L 19/149* (2013.01); *G04B 37/08* (2013.01); *G04B 37/088* (2013.01); *G04B 47/066* (2013.01); *G04G 17/08* (2013.01); *G04G 21/02* (2013.01)

(58) Field of Classification Search
CPC ....... G01F 23/14; G01F 23/164; G01L 7/084; G01L 19/0046; G01L 19/0645; G01L 19/149; G01L 7/082; G01L 19/147; G04B 37/08; G04B 37/088; G04B 47/066; G04G 17/08; G04G 21/02; G01C 5/06; F16J 15/021; F16J 15/32; B63C 11/02
USPC .......................................................... 73/299
See application file for complete search history.

(56) References Cited

U.S. PATENT DOCUMENTS

| | | | |
|---|---|---|---|
| 3,651,693 A | 3/1972 | Alinari | |
| 2010/0319459 A1* | 12/2010 | Rebeaud ................. | G01C 5/06 73/715 |

(Continued)

FOREIGN PATENT DOCUMENTS

| | | |
|---|---|---|
| CN | 101929900 A | 12/2010 |
| EP | 0670532 A1 | 9/1995 |

(Continued)

OTHER PUBLICATIONS

JP-2018072127—May 2018 (Year: 2018).*

(Continued)

*Primary Examiner* — Peter J Macchiarolo
*Assistant Examiner* — Monica S Young
(74) *Attorney, Agent, or Firm* — Sughrue Mion, PLLC

(57) ABSTRACT

A seal for a depth gauge having an axis of revolution, the seal including a radially inner flank and a radially outer flank, wherein the radially inner flank has a height (h1) greater than a height (h2) of the radially outer flank. Also, a depth gauge with the seal.

9 Claims, 3 Drawing Sheets

(51) Int. Cl.
    *G04G 17/08*     (2006.01)
    *G04G 21/02*     (2010.01)

(56) References Cited

U.S. PATENT DOCUMENTS

2014/0367922 A1   12/2014   Martin et al.
2016/0222892 A1*   8/2016   Akazaki ................. F02D 41/28

FOREIGN PATENT DOCUMENTS

| | | | | | |
|---|---|---|---|---|---|
| EP | 1850214 | A2 | * | 10/2007 | ......... G02F 1/13338 |
| EP | 2264399 | A1 | | 12/2010 | |
| JP | 2005164478 | A | * | 6/2005 | |
| JP | 2006-97807 | A | | 4/2006 | |
| JP | 2006097807 | A | * | 4/2006 | |
| JP | 2011-2450 | A | | 1/2011 | |
| JP | 2015-507161 | A | | 3/2015 | |
| JP | 2015200192 | A | * | 11/2015 | ........... F02D 35/023 |
| JP | 2017-102043 | A | | 6/2017 | |
| JP | 2018072127 | A | * | 5/2018 | ........... H05K 5/0017 |
| WO | WO-2005083307 | A1 | * | 9/2005 | ............. F16J 15/024 |

OTHER PUBLICATIONS

JP-2006097807—Apr. 2006 (Year: 2006).*
Citation copy EP-1850214 (Year: 2007).*
European Search Report of EP21171306.0 dated Oct. 12, 2021.

* cited by examiner

DEPTH GAUGE SEAL

CROSS REFERENCE TO RELATED APPLICATIONS

This application is claiming priority based on European Patent Application No. 21171306.0 filed on Apr. 29, 2021, the disclosure of which is incorporated herein in its entirely by reference.

TECHNICAL FIELD OF THE INVENTION

The field of the invention relates to devices for sealing a depth gauge subjected to the pressure of a fluid.

The invention relates more particularly to a seal of a depth gauge, and more particularly of a mechanical depth gauge, comprising a membrane pressure sensor, the seal ensuring tightness at the membrane pressure sensor.

The invention also relates to a timepiece comprising such a mechanical depth gauge.

TECHNOLOGICAL BACKGROUND

As illustrated in FIG. 1, mechanical depth gauges 1 make it possible to indicate water depth, for example by means of a rotating hand 2 facing a graduation 3 of a dial 4, particularly using a pressure sensor housed in the depth gauge case 6. The pressure sensor is conventionally connected to the hand 2 by a mechanical transmission.

The pressure sensor is generally housed in a pressure chamber arranged in the case 6, such a chamber is intended to receive a pressurised fluid.

In mechanical depth gauges, it is common for the pressure sensor to comprise a deformable membrane, for example in the form of a metallic disk comprising concentric undulations so as to modify the amplitude of elastic deflection.

To fasten such a pressure sensor and ensure tightness between the inside and the outside of the depth gauge case, it is known to solder the deformable membrane, see for example patent application DE 10 147 124, or to grip the deformable membrane as proposed in the document WO 01/01098. However, the manufacture of these deformable membranes is relatively complex and does not have a satisfactory reproducibility. Moreover, it is not easy to ensure that the deformable membrane will not enter the plastic deformation range thereof if the pressure sensor were subjected to a pressure exceeding the service pressure thereof.

To remedy these drawbacks, manufacturers have replaced these metallic disks with undulations by flat deformable membranes, but the fastening method continues to create quite substantial drawbacks. Indeed, if the peripheral region of the deformable membrane is soldered to the sensor structure, this reduces the elastic deformation that the membrane can withstand before being deformed plasticly, therefore the sensitivity of the pressure sensor is reduced.

Moreover, soldering introduces different stiffness characteristics for each solder. The resulting inaccuracies on the deflections of the deformable membrane obviously reduce the precision of the sensor and, furthermore, make it difficult to use bankings preventing plastic deformations of the deformable membrane. Fastening the deformable membrane by setting in the structure of the sensor also has some of the drawbacks mentioned above.

To partially remedy these drawbacks, a pressure sensor of simple design has been proposed, enabling the deformable membrane to flex as freely as possible under the pressure of the fluid while retaining satisfactory tightness thanks to the use of a seal.

Thus, the document EP 2 264 399 proposes not rigidly connecting the peripheral region of the deformable membrane to the body of the depth gauge, or to the cover, such that the peripheral region of the deformable membrane can pivot on a banking strip when the deformable membrane flexes under the effect of an increase in pressure of the fluid in the pressure chamber. Such an architecture is represented by FIG. 2, which illustrates a peripheral region of the case 6 of a depth gauge 1.

To ensure the tightness of such an assembly, an O-ring type seal 7 is compressed against the peripheral region of the deformable membrane 8 to ensure the tightness of the inner volume of the depth gauge in relation to the pressure chamber 10. The seal 7 furthermore serves as a support element to press the peripheral region of the deformable membrane 8 constantly against a banking 9, particularly when the deformable membrane 8 pivots.

The O-ring 7 is housed in a circular groove 11, with a rectangular profile, formed at the bottom of the depth gauge. Such a circular groove 11 has the advantage of facilitating the positioning of the O-ring 7 during assembly. Such a circular groove 11 also makes it possible to limit the radial spreading of the O-ring 7 upon the compression thereof, during the assembly as well as the pressurization of the pressure chamber 10 and therefore the deformation of the deformable membrane 8. The circular groove 11 therefore makes it possible to ensure a sufficient contact pressure on the deformable membrane 8 to ensure the required tightness in the range of use of the depth gauge.

However, in the case of intensive use of the depth gauge, as described in the application EP 2 264 399 and illustrated in FIG. 2, and/or in the case of poor cleaning thereof by the user, salt residue can build up in the circular groove 11 or in the vicinity of this circular groove, resulting in a risk of corrosion of this region and in premature wear of the deformable membrane 8.

SUMMARY OF THE INVENTION

In this context, the invention proposes a novel depth gauge seal having a profile particularly suitable for use at a pressure sensor, particularly with a deformable membrane making it possible to correctly ensure the required tightness levels for such a use, while making it possible to simplify the geometry of the different elements at the sealing zone of the depth gauge so as to prevent the build-up of salt residues in this peripheral region of the deformable membrane.

For this purpose, the invention relates to a seal for a depth gauge of axis of revolution Z comprising a radially inner flank and a radially outer flank, characterised in that the radially inner flank of said seal has a greater height than a height of the radially outer flank.

Besides the features mentioned in the paragraph above, the seal according to the invention can have one or more of the following additional features, considered individually or according to any technically possible combinations:
- the seal has a section, along a radial cutting plane, having a polygonal shape;
- the section has a trapezoidal shape comprising two parallel sides, the two parallel sides of the trapezium being formed by the radially outer flank and the radially inner flank;
- the section has a top face comprising at least one inclined planar portion with respect to a bottom face;

the top face comprises a first planar portion parallel with a bottom face and an inclined planar portion with respect to the bottom face;

said at least one inclined planar portion has an inclination with respect to said bottom face, said inclination being greater than 0° and less than or equal to 45°;

the seal has a section, along a radial cutting plane, having a quarter-circle shape;

the seal is made of elastomer, preferably of nitrile;

the seal is configured to be compressed against a deformable membrane of a depth gauge pressure sensor.

The invention also relates to a depth gauge comprising:

a case closed by a bottom, the bottom delimiting a pressure chamber in fluidic communication with the outside of the depth gauge, a pressure sensor comprising a deformable membrane disposed above said pressure chamber;

a seal according to the invention, the seal ensuring the tightness of said case in relation to said pressure chamber.

Advantageously, the seal is compressed and forms a support element of said deformable membrane.

Advantageously, the seal is disposed at a peripheral region of said deformable membrane.

Advantageously, the peripheral region of the deformable membrane can pivot pressing on the seal when the deformable membrane is deformed under the effect of an increase in pressure in the pressure chamber.

Advantageously, the bottom is devoid of a channel or a groove for housing the seal.

Advantageously, the bottom comprises a top face delimiting a bottom portion of said pressure chamber, the seal being positioned directly on the top face of the bottom delimiting said bottom portion of said pressure chamber.

Advantageously, the depth gauge comprises an indexing member provided on the top face of the bottom to facilitate the centering of said seal.

Advantageously, the seal delimits a peripheral portion of said pressure chamber.

Advantageously, the deformable membrane is formed by a metallic disk or by an amorphous metal alloy disk.

Advantageously, the disk is flat.

The invention also relates to a timepiece, for example a watch, and more particularly a diving watch, comprising a depth gauge according to the invention.

BRIEF DESCRIPTION OF THE FIGURES

The aims, advantages and features of the present invention will emerge on reading the following detailed description with reference to the following figures.

In all the figures, common elements bear the same reference numbers unless specified otherwise.

DETAILED DESCRIPTION OF THE INVENTION

Figure 1:
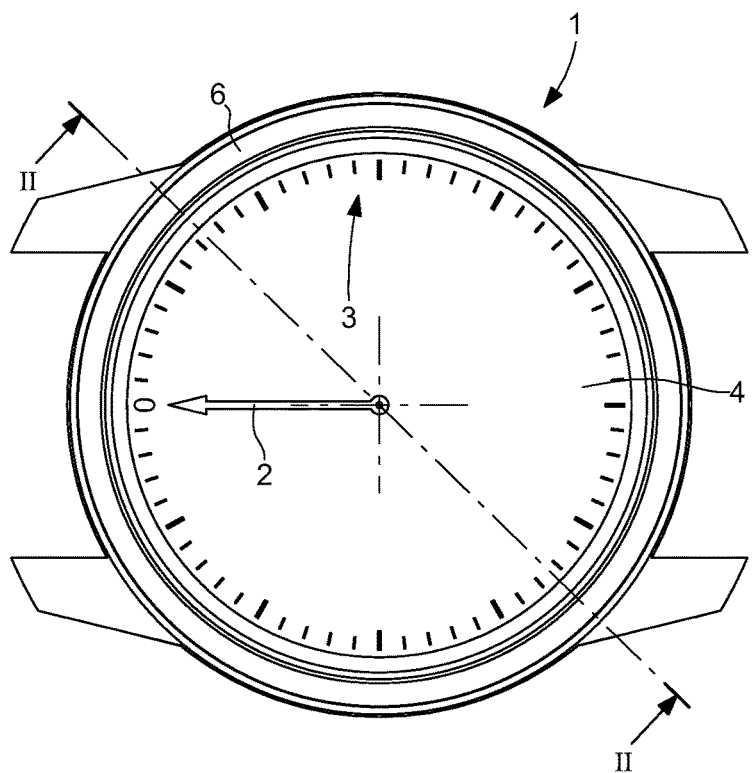
FIG. 1 is a schematic representation of a front view of a depth gauge equipped with a membrane pressure sensor according to the prior art.
Figure 2:
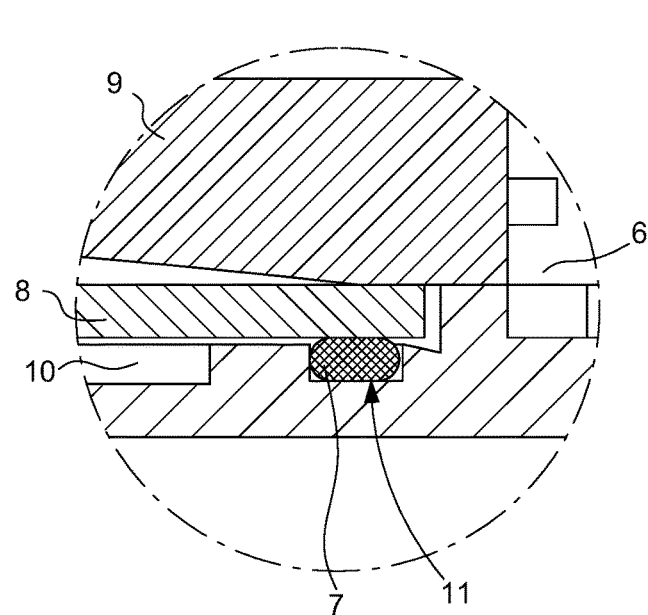
FIG. 2 is a partial radial sectional representation along the line II banking's of the peripheral region of the depth gauge according to the prior art illustrated in FIG. 1.

FIGS. 1 and 2 have been described above in the preamble of the invention.

Figure 3:
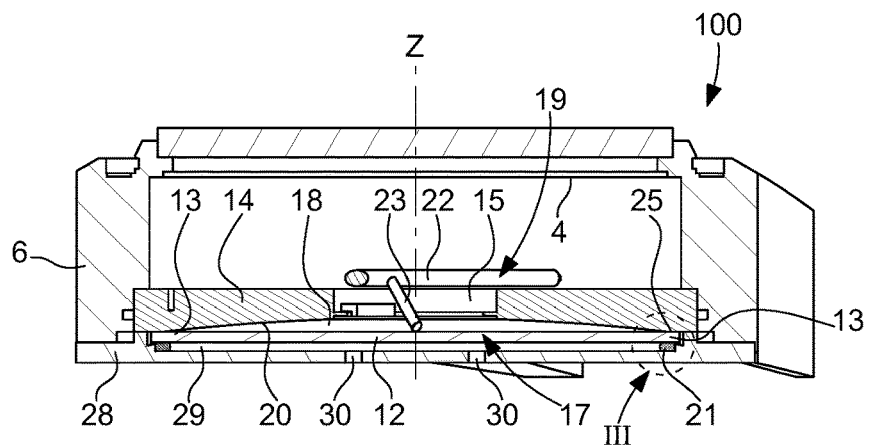
FIG. 3 is a schematic and partial radial section view of an embodiment example of a depth gauge according to the invention equipped with a membrane pressure sensor and a seal according to the invention.
Figure 4:
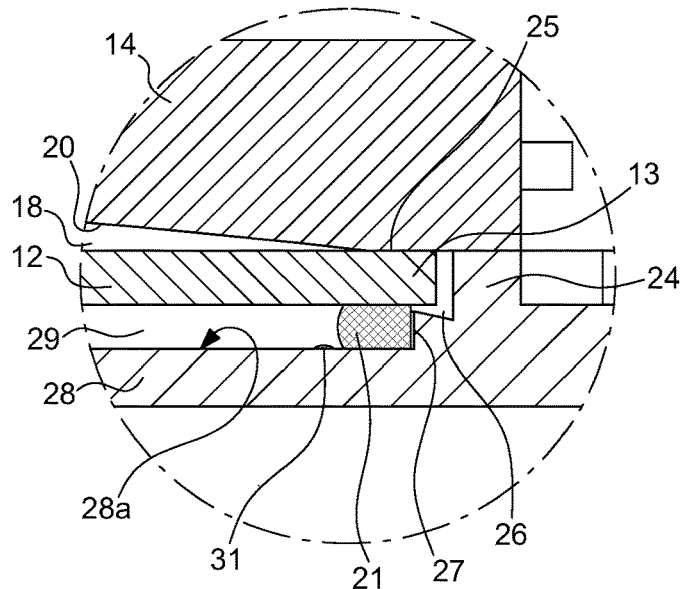
FIG. 4 is an enlarged view of detail III in FIG. 3, illustrating more particularly the peripheral region of the pressure sensor and the seal according to the invention when the depth gauge is not subjected to external pressure greater than atmospheric pressure.
Figure 5:
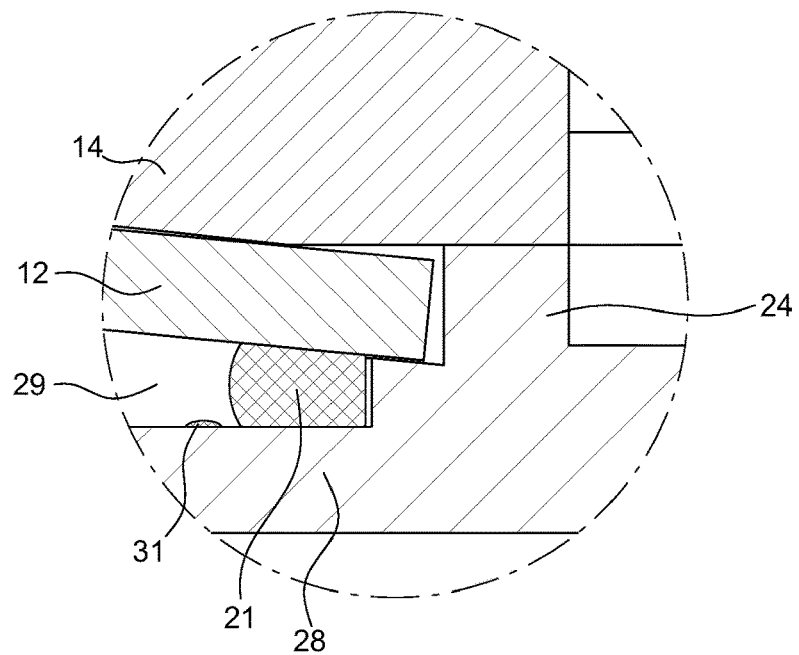
FIG. 5 is an enlarged view of detail III in FIG. 3, illustrating more particularly the peripheral region of the pressure sensor and the seal according to the invention when the depth gauge is subjected to external pressure greater than atmospheric pressure.

FIGS. 3 to 5 schematically represent a depth gauge 100, of axis of revolution Z, according to the invention.

The depth gauge 100 is, for example, a depth gauge intended to be worn on a user's wrist, thanks to a wristlet (not shown). Conventionally, the depth gauge 100 according to the invention comprises a hand 2 indicating the water depth, the hand 2 rotating facing a graduation 3 provided on a dial 4, using a pressure sensor 17 housed in the case 6 of the depth gauge 100.

The pressure sensor 17, positioned in the bottom part of the case 6, is connected to the hand 2 by a mechanical transmission member 19 configured to convert the axial movement of the pressure sensor 17, along the axis of revolution Z of the depth gauge 100, into a rotational movement about the axis of revolution Z.

The transmission member 19 particularly comprises a rotary shaft 22 equipped with a feeler-spindle 23. Obviously, other mechanical transmission member architectures can be envisaged without leaving the context of the invention.

It will be noted that the depth gauge 100 can be combined with a watch in the same case 6, particularly a diving watch, without however being essential. In this case, the case 6 further comprises a horological movement (not shown) and the dial 3 has graduations to indicate information relating to time information.

The case 6 is closed by a pierced bottom 11. The pressure sensor 17 is for example mounted on the bottom 11 of the case 6, as illustrated in FIGS. 3 to 5.

The pressure sensor 17 is disposed above a pressure chamber 29 delimited by the bottom 28. The pressure chamber 29 communicates with the outside of the case 6 through holes 30, such that the pressure chamber 29 is in fluidic communication with the outside of the depth gauge 100. Thus, the fluid contained in this pressure chamber 29 is subjected to the pressure prevailing around the depth gauge 100.

The pressure sensor 17 comprises a deformable membrane 12, for example of flat and circular shape, in which the peripheral region 13 is clamped between the bottom 28 and a rigid banking 14 fastened in the case 6 capable of limiting the deformation of the deformable membrane 12 of the pressure sensor 17.

In the embodiment example represented in FIG. 3, the rigid banking 14 is equipped with a central opening 15, particularly for inserting the feeler-spindle 23. Thus, the feeler-spindle 23 can move vertically in the opening 15 and pivot the shaft 22 according to the displacements (deformations) of the deformable membrane 12.

Obviously, the shape of the rigid banking 14 can be different and not have a central opening 15 according to the architecture of the transmission member used.

A return spring (not shown) keeps the free end of the feeler-spindle 23 pressing against the deformable membrane 12 so as to ensure permanent contact between these two elements.

Between the opening 15 and the peripheral region 13 of the deformable membrane 12, the rigid banking 14 has a slightly concave bottom face which delimits, with the deformable membrane 12, a chamber 18 communicating with the rest of the inner volume of the case 6 via the opening 15. This concave face forms a stop surface 20 to limit the deflection of the deformable membrane 12 once the latter is subjected to a differential pressure exceeding a limit pressure which will be defined hereinafter.

The inner volume of the case 6 contains air or another gas, at a reference pressure.

A seal 21, of axis of revolution Z, is compressed against the deformable membrane 12, more particularly at the peripheral region 13 thereof, and ensures the tightness of the inner volume of the case 6 in relation to the pressure chamber 29 and the outside of the case 6.

The seal 21 also forms a support element of the deformable membrane 12, configured to press the peripheral region 13 of the deformable member 12 constantly against the rigid banking 14, regardless of the deformation state of the deformable membrane 12. The compression of the seal 21 against the deformable membrane makes it possible to obtain a sufficient contact pressure to ensure the tightness of the case 6.

As illustrated in FIG. 5, which illustrates more specifically the peripheral region of the pressure sensor 17 and the seal 21 according to the invention when the deformable membrane 12 is deformed and the pressure sensor 17 is subjected to a differential pressure between the chambers 29 and 18, the seal 21 is configured to enable the pivoting of the peripheral region 13 of the deformable membrane 12 while ensuring the contact pressures required to ensure the tightness of the inner volume of the case 6.

The bottom 28 has a vertical rim 24, arranged in a peripheral region of the bottom 28, which abuts against the rigid banking 14 and the height of which is selected in such a way that the seal 21 is, as illustrated in FIG. 4, substantially pre-stressed against the deformable membrane 12, to guarantee the tightness therebetween in the entire range of service pressures of the pressure sensor 17 of the depth gauge 100.

The compression of the seal 21 presses the peripheral region 13 of the deformable membrane 12 against a part of the rigid banking 14, that is to say a support strip 25 which follows the edge of the concave stop surface 20 and is located practically facing the position of the seal 21. The support strip 25 is planar in this example, but it could also have a rounded or ridged transverse profile.

The material and the thickness of the deformable membrane 12 are selected in such a way that the deformations of the deformable membrane 12 remain within the elastic range in the entire range of pressures to which the sensor 17 will be subjected.

The deformable membrane 12 is produced from a material conventionally used and known to a person skilled in the art for such an application.

Preferably, the deformable membrane 12 is a metallic disk or a disk made of amorphous metal alloy also known as metallic glass.

Thanks to the planar shape thereof at rest, the method for manufacturing the deformable membrane is carried out easily, for example by cutting in a stainless steel sheet. The other elements of the pressure sensor 17, apart from the seal 21, can be made of metal or of rigid synthetic material, for example.

When the depth gauge 100 is plunged to a certain depth in water, the deformable membrane 12 flexes elastically under the increased differential pressure between the chambers 29 and 18 located on either side of the deformable membrane 12. The deflection of the deformable membrane 12 is transmitted to the feeler-spindle 23. The mechanical transmission by the transmission member 19 between the feeler-spindle 23 and the hand 2 is arranged to produce a practically linear movement of the hand 2 according to the pressure variation. However, it is also possible to produce a non-linear movement of the hand 2 according to the transmission member 19 and the different geartrains used. In this case, the dial will have a non-linear graduation 3.

The shape given to the stop surface 20 corresponds advantageously to the profile of the deformed shape of the deformable membrane 12 for the limit pressure mentioned above. This profile, theoretically parabolic for a circular membrane in which the deflections are small, can be approached by a spherical dome shape, easy to machine. Preferably, said limit pressure is slightly greater than the maximum service pressure of the depth gauge 100. As the latter must generally be subjected to a maximum test pressure substantially greater than the maximum service pressure, the main role of the stop surface 20 is that of preventing plastic deformations of the deformable membrane 12 under these test conditions, since the deformable membrane 12 is then shouldered by the rigid banking 14 which is much more rigid than it.

In the embodiment example illustrated in FIGS. 3 to 5, only the central part of the deformable membrane 12 facing the opening 15 might be subjected to additional deflection, but the additional stress is reduced and, with suitable dimensioning, can remain within the elastic range. Obviously, these advantages also exist in cases where the pressure sensor was accidentally subjected to excessive pressure, for example a water hammer in a pressure gauge.

Given that the peripheral region 13 of the deformable membrane 12 is neither soldered nor set in the structure supporting it, it can pivot virtually freely on the support strip 25 to tilt and approach the banking surface 20.

It will also be noted that a countersink 26 is arranged between the seal 21 and the vertical rim 24 to enable the edge of the deformable membrane 12 to lower freely during the deformation thereof.

Figure 6:
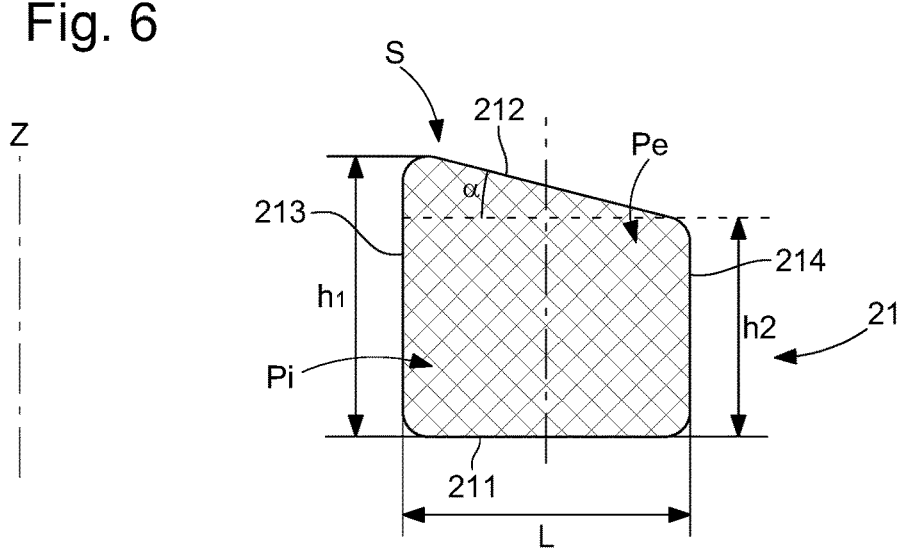
FIG. 6 is a schematic representation of the section along a radial cutting plane of a first embodiment example of the seal according to the invention.
Figure 7:
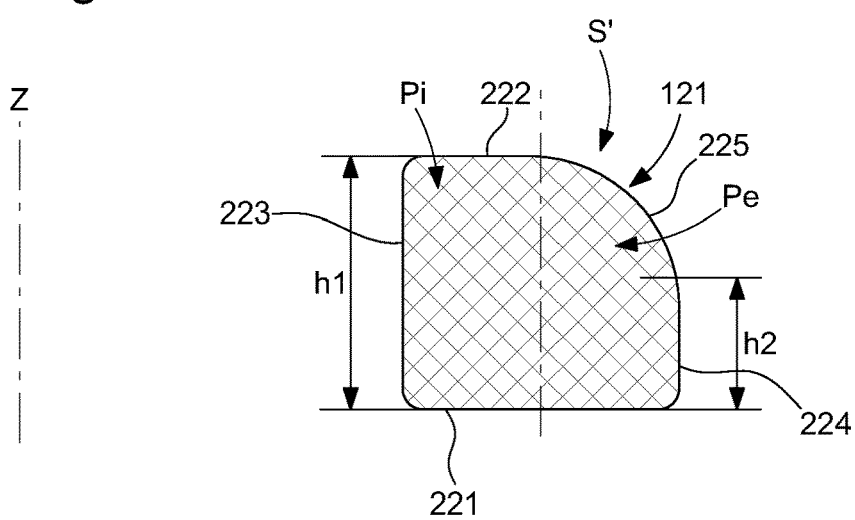
FIG. 7 is a schematic representation of the section along a radial cutting plane of a second embodiment example of the seal according to the invention.

FIG. 6 represents a first embodiment example of the seal 21 according to the invention and FIG. 7 represents a second embodiment example of the seal 121 according to the invention.

FIG. 6 illustrates more specifically, schematically, the section S, along a radial cutting plane, of the first embodiment example of the seal 21 according to the invention, in the non-compressed state thereof.

FIG. 7 illustrates more specifically, schematically, the section S', along a radial cutting plane, of the second embodiment example of the seal 121 according to the invention, in the non-compressed state thereof.

Unlike the seals known from the prior art described in the preamble of the invention with reference to FIG. 2, the seal 21, 121 according to the invention has a non-circular section and has no symmetry between a radially inner portion Pi and a radially outer portion Pe.

In FIGS. 6 and 7, a radially inner portion Pi is positioned to the left of a dotted-line axis representing the middle of the width L of the section S, S' of the seal 21, 121, and a radially outer portion Pe is positioned to the right of the dotted-line axis in question.

The expressions "radially inner" and "radially outer" are obviously to be taken into consideration in relation to the axis of revolution Z of the depth gauge 100 and the seal 21, 121, both axes of revolution being merged. Thus, a radially inner portion, flank or face is radially closer to the axis of revolution Z than a radially outer portion, flank or face.

The term flank denotes the lateral part of the seal 21, 121.

Figure 8:
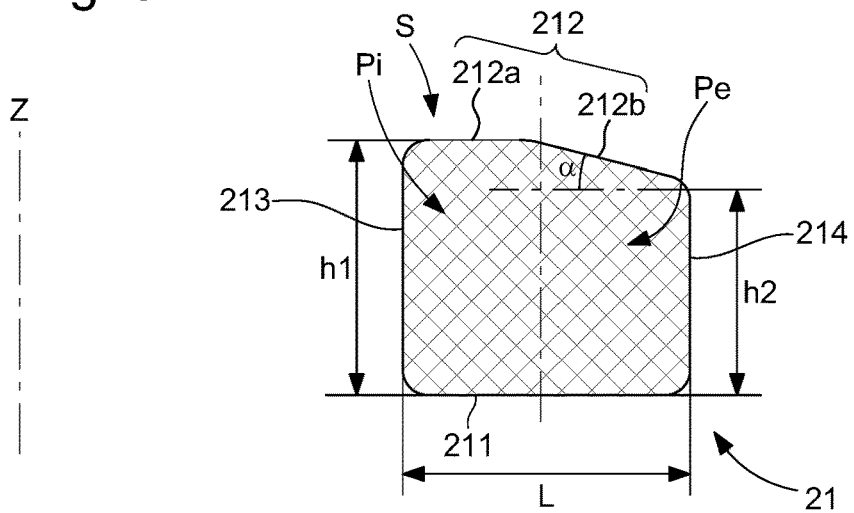
FIG. 8 is an alternative embodiment of the first embodiment example of the seal according to the invention illustrated in FIG. 6.

As represented in FIGS. 6 to 8, the seal 21, 121 has, in the non-compressed state thereof, a radially inner flank 213, 223 having a height h1 greater than the height h2 of the radially outer flank, therefore inducing a difference in material thickness between the radially inner portion Pi and the radially outer portion Pe of the seal 21, 121.

For example, the ratio between the height h1 of the radially inner flank 213, 223 to the height h2 of the radially outer flank 214, 224 is between 2 and 1.25.

For example, the height h1 of the radially inner flank 213, 223 is identical to the width L of the seal 21, 121.

The difference in height between the radially inner flank 213, 223 and the radially outer flank 214, 224 makes it possible advantageously to obtain a difference in material volume, between the radially inner portion Pi and the radially outer portion Pe of the seal 21, 121.

This difference between the radially inner portion Pi and the radially outer portion Pe makes it possible to retain a sufficient contact pressure over the entire contact surface area of the seal 21 when the deformable membrane 12 is deformed and pivots at the seal 21, 121, thus releasing the contact pressure previous obtained during the compression of the seal 21, 121, during the clamping and mounting of the bottom 28 on the case 6. Indeed, when the deformable membrane 12 is deformed under a positive pressure, it will move towards the rigid banking 14 and therefore away from the case bottom 28.

The seal 21, 121 according to the invention has a geometry making it possible advantageously to remove the use of a channel or a groove for housing the seal, arranged conventionally at the bottom as shown in FIG. 2, and therefore the need to have a support surface at the radially inner portion thereof in order to stress the seal radially with the aim of limiting the radial spreading thereof and maintaining sufficient compression during the deformation of the deformable membrane 12 in order to ensure the required tightness levels.

Indeed, the seal 21, 121 according to the invention has a sufficient rigidity, particularly at the radially inner portion Pi thereof, so as not to need a support surface capable of limiting the radial spreading thereof during the compression thereof against the deformable membrane 12.

Thus, the seal 21, 121 according to the invention makes it possible to ensure the tightness of the case 6 within the entire range of service pressures of the pressure sensor 5 of the depth gauge 100, while enabling the overpressure of such a channel or groove causing the build-up of salt residues in this region close to the peripheral region 13 of the deformable membrane 12.

Thus, the seal 21, 121 according to the invention makes it possible advantageously to be able to remove any rib, roughness promoting a build-up of salt residues in the event of poor cleaning of the depth gauge 100, while ensuring the required tightness levels within the range of use of the depth gauge 100.

The seal 21, 121 according to the invention is advantageously positioned directly on a top face 28a of the bottom 28, delimiting the bottom portion of the pressure chamber 29, the top portion of the pressure chamber 29 being delimited by the bottom face of the deformable membrane 12.

With the seal 21, 121 according to the invention, the peripheral portion of the pressure chamber 29 is delimited directly by the seal 21, 121, and particularly by the radially inner flank 213, 223 thereof.

As illustrated in FIGS. 4 and 5, the bottom 28 can however have in a radially outer region in relation to the seal 21, 121, a wall 27, for example vertical or slightly inclined, capable of forming a lateral banking for positioning the seal 21, 121. Thus, sliding thereof during assembly is prevented and the correct positioning of the seal 21, 121 facing the support strip 25 of the rigid banking 14 is ensured. This region not being in communication with the fluid circulating in the pressure chamber 29, there is no risk of build-up of salt residues and therefore no risk of premature degradation of the deformable membrane 12.

With reference to FIG. 6, the first embodiment example of the seal 21 has a section S of polygonal shape, and more particularly of trapezoidal shape comprising two parallel sides, the two parallel sides of the trapezium being formed by the radially outer flank 214 and the radially inner flank 213 of the seal.

The section S of the seal 21 has planar surfaces separated from one another by rounded sectors forming coupling portions between the different planar surfaces or faces.

More specifically, the seal 21 comprises four planar faces:
a bottom face 211;
a top face 212;
a radially inner lateral face forming the radially inner flank 213 mentioned above, and
a radially outer lateral face forming the radially outer flank 214 mentioned above.

The rounded sectors connecting the different faces having a section shaped in the arc of a circle, the rounded surfaces being capable of having relatively large radii of curvature.

Preferably, the radially inner lateral face and the radially outer lateral face extend along a direction substantially perpendicular to the bottom face 211. Thus, the flanks 213, 214 of the seal 21 extend substantially perpendicularly to the bottom face 211.

The top face 212 of the seal 21 has at least one portion having an inclination with respect to the bottom face 211 for example an inclination greater than 0° and less than or equal to 45°.

In the embodiment example illustrated in FIG. 6, the entire top face 212 is inclined, however, according to an alternative embodiment illustrated in FIG. 8, it is also envisaged that the top face 212 has a first planar portion 212a parallel with the bottom face 211 and a second planar portion 212b having an inclination with respect to the bottom face 211. In this case, the inclined planar portion 212b will be positioned in a radially outer region with respect to the first planar portion 212a.

The inclination of at least one portion of the top face 212 of the seal 21, intended to be in contact with the deformable membrane 12, makes it possible to improve the behaviour of the seal 21 further during the pivoting of the deformable membrane 12 as explained above.

The inclination of at least one portion of the top face 212 of the seal 21 also makes it possible to ensure an optimal and more homogeneous contact pressure, during the deformation of the deformable membrane 12, regardless of the pressure prevailing in the chamber 29.

Producing at least one inclined top surface makes it possible to ensure a sufficient contact pressure level between the seal 21 and the deformable membrane 12, within the entire pressure range of use of the depth gauge 100.

Thus, thanks to this specific geometry, the seal 21 according to the invention makes it possible to compensate for pressure losses during the pivoting of the deformable membrane 12 due to the removal of the support walls formed by a channel or a groove. Thus, the seal 21 makes it possible to ensure the required tightness levels particularly when the membrane is deformed, as illustrated by FIG. 5, when the tightness needs are greatest, and even in the absence of a channel or a groove limiting the spreading of the seal.

Furthermore, thanks to the seal according to the invention, the contact pressures at the deformable membrane 12 and at the bottom 28 are more homogeneous over the entire surface areas in comparison with the circular O-ring in the absence of a channel or a groove.

FIG. 7 illustrates a second embodiment example of the seal 121 according to the invention.

The seal 121 is identical to the first embodiment example described above, except for that which will be described hereinafter. Thus, all of the features described with reference to the first embodiment example also apply for this second embodiment example.

The seal 121 also comprises four planar faces:
a bottom face 221;
a top face 222;
a radially inner lateral face forming the radially inner flank 223 mentioned above, and
a radially outer lateral face forming the radially outer flank 224 mentioned above.

In this second embodiment example, the inclined top face 212 is replaced by a planar top face 222, substantially parallel with the bottom face 221, and of reduced dimension (for example of the order of L/2) and the coupling sector 225 between the top face 222 and the radially outer face 224 has a greater radius of curvature, typically of the order of L/2.

Thus, the top face 222 and the radially outer face forming the radially outer flank 224 have a smaller dimension than the first embodiment example, typically of the order of L/2.

The section of the seal 121 according to this second embodiment example could resemble a quarter-circle shape.

In the same way as for the first embodiment example, this shape of the seal 121, according to this second embodiment example, makes it possible advantageously to do away with the use of a channel or a groove for housing the seal, arranged conventionally at the bottom 28, and the need to have a support surface at the radially inner portion thereof in order to stress the seal radially with the aim of limiting the radial spreading thereof and maintaining a target compression during the compression of the seal in order to ensure the required tightness levels.

The rounded surface 225 having a significant surface area also makes it possible to improve the behaviour of the seal 121 during the pivoting of the deformable membrane 12 in order to ensure an optimum and homogeneous contact pressure over an extended surface area.

Obviously, other seal section profiles are envisaged without leaving the context of the invention once they have a greater material volume at a radially inner portion in relation to a radially outer portion and the top face of the seal has a profile making it possible to follow the pivoting of the deformable membrane 12 when it is subjected to a pressure differential with no loss of homogeneity at the contact pressures.

The seal 21, 121 is made of elastomer, preferably of nitrile.

The bottom 28 can also comprise an indexing element 31 arranged on at least a portion of the top face 28a of the bottom 28 to facilitate the positioning and centering of the seal 21, 121 in the absence of a channel or a groove.

This indexing element 31 forms a protuberance, such as a boss. The indexing element 31 extends circularly over at least a portion of the top face 28a of the bottom 28. Preferably, the indexing element 31 is circular.

Such an indexing element 31 forms a visual and/or sensory indicator facilitating the positioning and centering of the seal 21, 121 during assembly. It will be noted that this indexing element 31 has a height substantially less than the height of the seal 21, 121 or than the vertical rim 27. Indeed, the indexing element 31, as described and represented, is not intended to form a channel or a groove for positioning the seal 21, 121 but forms a slight boss capable of indicating the correct centering of the seal 21, 121.

In respect of the assembly of the pressure sensor 17, it is easily understood that it is particularly simple, particularly as it is simply necessary to:
insert the rigid banking 14 into the case 6,
position the seal 21, 121 on the top face 28a of the bottom 28,
fit the sealing membrane 12 on the seal 21, 121,
fasten the bottom 28 to the case 6 in the usual manner; the height of the second vertical rim 24 automatically determines the pre-stress force applied to the seal 21, 121.

The invention also relates to a timepiece, such as a watch, and particular a diving watch, comprising a depth gauge as well as a seal according to the invention capable of ensuring the tightness of the pressure sensor in relation to the timepiece case.

The seal according to the invention also enables the following advantages:
ensuring the required tightness levels regardless of the diving depths and therefore regardless of the positions of the pressure sensor;
a similar size to the seals conventionally used in depth gauges, and particularly diving watches;
removing the problems of corrosion of the peripheral region of the deformable membrane by removing the channel or the groove for positioning the seal.

The invention claimed is:
1. A depth gauge comprising:
a case closed by a bottom, said bottom delimiting a pressure chamber in fluidic communication with the outside of the depth gauge,
a pressure sensor comprising a deformable membrane disposed above said pressure chamber; and
a seal including a radially inner flank and a radially outer flank, the radially inner flank having a height greater than a height of the radially outer flank in an undeformed state, said seal being sandwiched between the deformable membrane and the bottom to ensure tightness of said case in relation to said pressure chamber including when the deformable membrane is in a deformed state, wherein the bottom and the deformable member are devoid of a channel or a groove for housing said seal such that said seal is not retained in any channel or groove.

2. The depth gauge according to claim 1, wherein said seal is compressed and forms a support element of said deformable membrane.

3. The depth gauge according to claim 2, wherein said seal is disposed at a peripheral region of said deformable membrane.

4. The depth gauge according to claim 3, wherein said peripheral region of the deformable membrane can pivot pressing on the seal when the deformable membrane is deformed under the effect of an increase in pressure in the pressure chamber.

5. The depth gauge according to claim 1, wherein said bottom comprises a top face delimiting a bottom portion of said pressure chamber, said seal being positioned directly on the top face of the bottom delimiting said bottom portion of said pressure chamber.

6. The depth gauge according to claim 5, wherein said depth gauge comprises an indexing member arranged on said top face of the bottom to facilitate the centering of said seal.

7. The depth gauge according to claim 1, wherein said seal delimits a peripheral portion of said pressure chamber.

8. The depth gauge according to claim 1, wherein said deformable membrane is formed by a metallic disk or by an amorphous metal alloy disk.

9. A timepiece comprising a depth gauge comprising:
a case closed by a bottom, said bottom delimiting a pressure chamber in fluidic communication with an outside of the depth gauge,
a pressure sensor comprising a deformable membrane disposed above said pressure chamber; and
a seal including a radially inner flank and a radially outer flank, the radially inner flank having a height greater than a height of the radially outer flank in an undeformed state, said seal being sandwiched between the deformable membrane and the bottom to ensure tightness of said case in relation to said pressure chamber including when the deformable membrane is in a deformed state,
wherein the bottom and the deformable member are devoid of a channel or a groove for housing said seal so that said seal is not retained in any channel or groove.

* * * * *